US005469614A

United States Patent [19]

Lyonnais

[11] Patent Number: 5,469,614

[45] Date of Patent: Nov. 28, 1995

[54] ELECTRICAL OUTLET COVER REMOVER

[76] Inventor: Debra Lyonnais, 4900 W. Leitner Dr., Coral Springs, Fla. 33067

[21] Appl. No.: 235,374

[22] Filed: Apr. 29, 1994

Related U.S. Application Data

[63] Continuation of Ser. No. 12,069, Aug. 20, 1993.

[51] Int. Cl.$^{6}$ .................................................. B23P 19/04

[52] U.S. Cl. ................................ 29/764; 29/1.01; 29/270

[58] Field of Search .............................. 29/758, 762, 764, 29/270, 1.01; 7/108; 81/436; D8/14, 88, 89; 174/67

[56] References Cited

U.S. PATENT DOCUMENTS

| | | | |
|---|---|---|---|
| 475,689 | 5/1892 | Hunt | D8/89 X |
| 1,359,777 | 11/1920 | Wright | D8/89 X |
| 2,383,573 | 8/1945 | Tomsek | 81/436 |
| 2,797,599 | 7/1951 | McGarvie, Jr. | 81/436 X |
| 2,985,208 | 5/1961 | Hibbard et al. | 81/177.5 X |
| 3,160,947 | 12/1964 | Sunderlin | 29/764 |
| 3,844,012 | 10/1974 | Sturtevant | 29/764 X |
| 4,199,833 | 4/1980 | Sitkins et al. | 7/166 |
| 4,367,664 | 1/1983 | Ekshtut | 81/436 |
| 4,440,048 | 4/1984 | Stevens et al. | 81/436 X |
| 5,140,877 | 8/1992 | Sloan | 81/436 X |

FOREIGN PATENT DOCUMENTS

| | | | |
|---|---|---|---|
| 45674 | 1/1909 | Switzerland | 7/166 |
| 2050900 | 1/1981 | United Kingdom | 81/436 |

OTHER PUBLICATIONS

Pritzlaff; Apr. 1953; p. 8; "Pinch Point" Carpenter Bar.
Haigh's Complete Specification, FIGS. 1–6 illustrating various screw–drivers, May 1884 No. 7468, one sheet, London.

*Primary Examiner*—Peter Vo
*Attorney, Agent, or Firm*—Malin, Haley, DiMaggio & Crosby

[57] ABSTRACT

A generally L-shaped electrical outlet cover remover having a handle and prying shank defined by a tapered end for wedging between the outlet plug and the outlet. The outlet cover remover may also include two handles with opposing prying shanks for removing the outlet cover from the outlet.

13 Claims, 4 Drawing Sheets

ELECTRICAL OUTLET COVER REMOVER

This application is a continuation of co-pending U.S. application Ser. No. 29/012,069 filed Aug. 20, 1993.

BACKGROUND OF THE INVENTION

1. Field of the Invention

The present invention relates generally to an electrical outlet plug remover, and more particularly relates to a nonconductive tool which is used to safely pry a plug or cover from an electrical outlet.

2. Description of the Prior Art

Electrical outlet safety plugs, or covers, provide an effective way to prevent shock injuries, but unfortunately they are difficult and inconvenient to remove from the outlets. The typical outlet plug comprises a flat cover having two non-conductive prongs that are plugged into the outlet receptacles. Once inserted into an outlet, the cover cannot be easily removed from the outlet because it lies flush against the outlet plate. As a result, removal of the cover is usually carried out by dangerously prying the cover from the outlet with a foreign object or a finger nail. While safety covers are used to prevent children and adults from inadvertently inserting a finger or metal object into the electrical receptacles, the dangers associated with electrical outlets are only enhanced when tools such as screw drivers or knives are used to remove the safety plugs from the outlet. Consequently, there exists a need for a simple tool which can be used to safely pry conventional electrical outlet safety plugs from their outlets.

Although, a variety of electrical outlet safety covers are disclosed in the background art, none addresses the problems considered by the present invention. For instance, Buckshaw, in U.S. Pat. No. 5,017,148, discloses a safety cap apparatus for electrical outlets which is secured to the face plate screw. The safety cover comprises a pair of safety plugs connected together by a tether which forms a tab when the covers are installed and continues to secure the outlet plugs to the outlet when not in use. Likewise, Bael, in U.S. Pat. No. 5,106,314, discloses an electrical outlet safety cover for permanent attachment to a wall socket which includes tabs extending outwardly from the sides of the plug and a central hole for affixing the cover to the socket. Other electrical outlet safety devices include the safety apparatus disclosed by Ray, in U.S. Pat. No. 4,618,740, the safety cover disclosed by Piper, in U.S. Pat. No. 4,801,271, the child proof outlet cover disclosed by Learner, in U.S. Pat. No. 4,671,587, and the security socket disclosed by Hu, in U.S. Pat. No. 4,600,258. By way of contrast, the present invention provides a separate, individual tool for prying and removing the conventional safety plug from an electrical outlet. Thus, the present invention facilitates safety cap removal rather than actually concealing the electrical outlet. The above noted background art neither solves nor addresses the problems contemplated by the present invention. There remains a need for a simple device capable of convenient implementation for removing electrical outlet safety plugs so that households will not be discouraged from using the plugs. The present invention solves these problems by providing a simple and safe device which allows one to easily remove an electrical outlet plug without risking injury.

SUMMARY OF THE INVENTION

It is an object of the present invention to provide a tool for removing electrical outlet safety plugs from electrical outlets which is convenient and safe to use.

It is another object of the invention to provide an electrical outlet safety cover remover that allows the continued use of inexpensive, conventional, outlet plugs which are presently in widespread use.

It is a further object of the invention to provide an electrical outlet safety plug remover that may be easily and conveniently stored when needed.

It is also an object of this invention to provide an electrical outlet safety cover remover that is simple in design and construction, and low in cost.

In accordance with these and other objects, the present invention is comprised of at least one non-conductive, substantially L-shaped member sized and shaped so as to be comfortably and conveniently held in the hand. A first leg forms a handle section and a second leg forms a prying shank that extends from the handle into a tapered prying wedge which defines a tip for prying an outlet cover from an outlet.

In a first embodiment, the outlet cover remover comprises a one-piece member with a substantially square shaped handle integrally joined to the prying shank at an upper end of the handle such that a smooth joint is created. The prying shank extends from the handle and tapers toward a tip defining a generally straight tip or edge perpendicular to the shank. The tip is substantially thin for wedging between the limited clearance normally found between the conventional plug and the outlet plate. In addition, the free end of the handle may define an aperture for securing the plug remover to an accessory cord, a key ring or a tether for attachment to a cord.

The handle and prying shank may be of equal length or, alternatively, the handle leg may be somewhat longer than the prying shank to provide a large moment arm and hence mechanical advantage when removing the outlet cover from the outlet. The handle leg may, alternatively, be substantially cylindrical in cross section.

To remove an electrical outlet plug, the prying shank is first wedged between the plug and outlet plate such that the prying shank passes between the prongs of the outlet cover. Then the handle is pulled upwardly to apply a prying force on the plug.

In an alternative embodiment, the electrical outlet cover remover comprises two L-shaped members joined at free ends of first and second handle legs to define a central hub support. The legs diverge from the hub such that the first and second prying shanks face each other resembling forceps. The prying shanks terminate in opposing tapered edges which define a plug cover receiving gap or opening therebetween. Each tip is adapted to be wedged between the outlet plug and the outlet plate generally between the prongs of the outlet cover from opposite sides of the cover so that when the handle legs are squeezed the outlet cover is pried from the outlet. The handle legs in this embodiment should be at least partially flexible to facilitate relative movement of the handle legs. The central hub may define an aperture for attaching the outlet cover remover to a cord, tether or key ring.

BRIEF DESCRIPTION OF THE DRAWINGS

The invention is described in detail below with reference to the accompanying drawings, in which.

DESCRIPTION OF THE PREFERRED EMBODIMENTS

Figure 6:
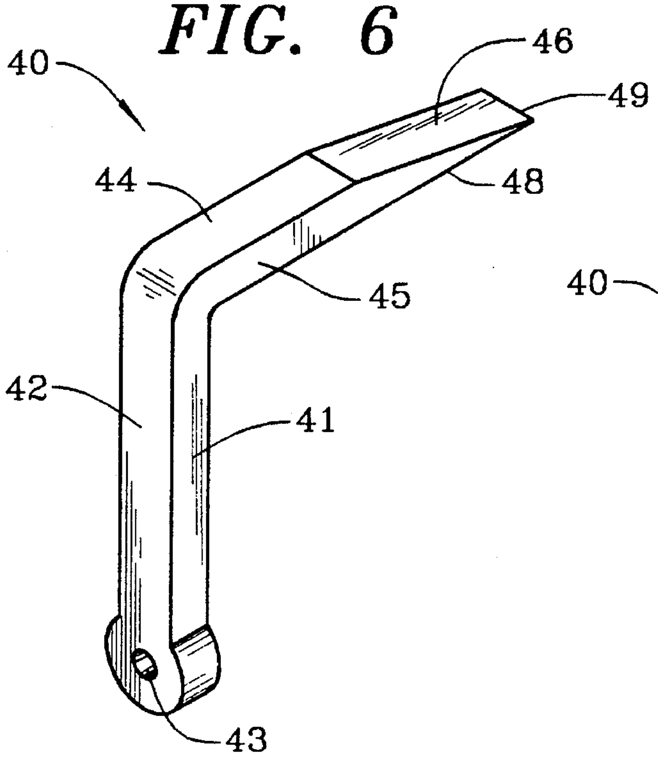
FIG. 6 is a perspective view of a second embodiment of the electrical outlet cover remover.
Figure 7:
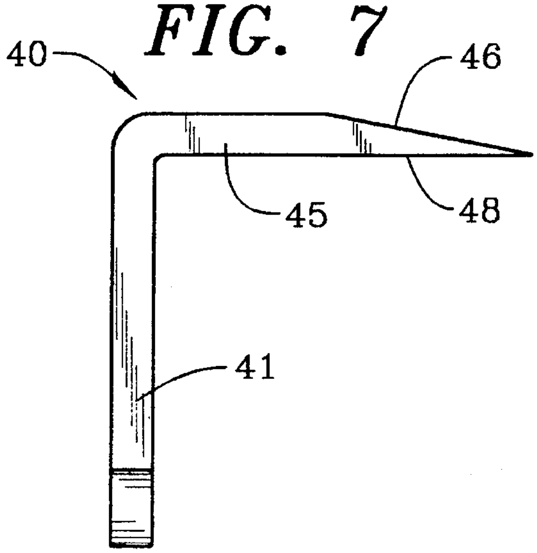
FIG. 7 is a side elevational view of the second embodiment of the electrical outlet cover remover shown in FIG. 6.
Figure 8:
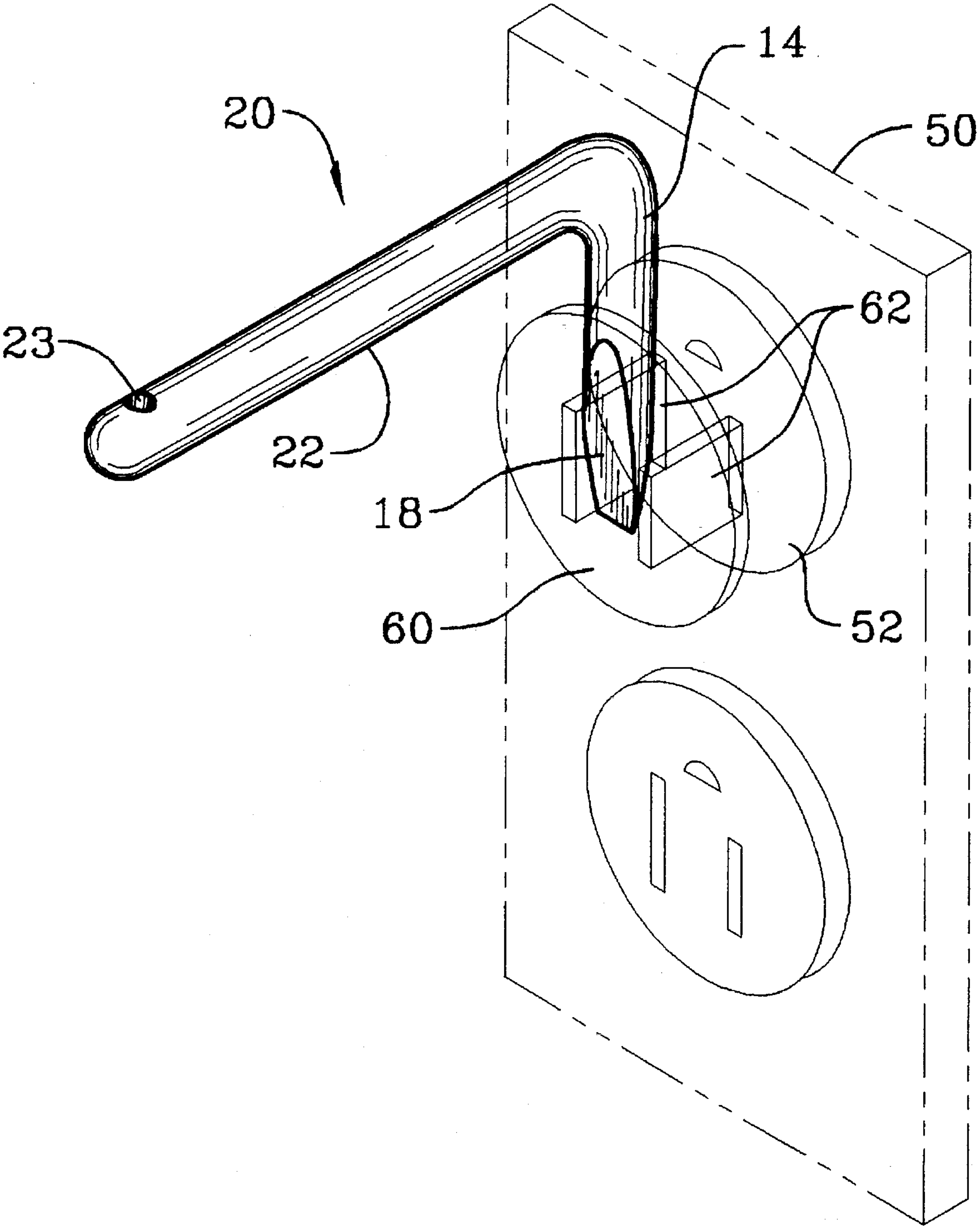
FIG. 8 is a perspective view of the electrical outlet cover remover shown in FIG. 4 removing a cover from an outlet.
Figure 9:
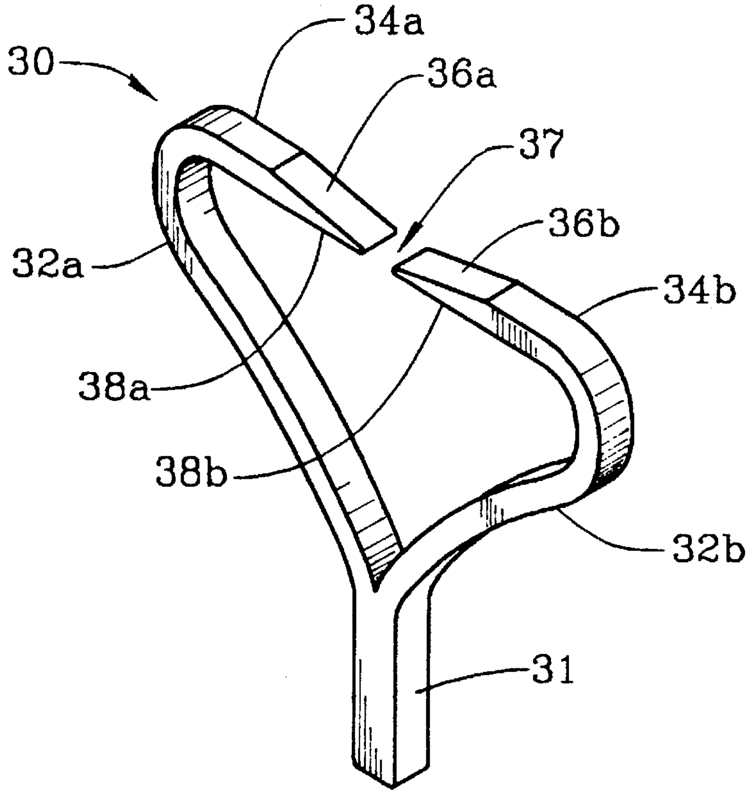
FIG. 9 is a perspective view of a third embodiment of the electrical outlet cover remover having two opposing prying shanks.
Figure 10:
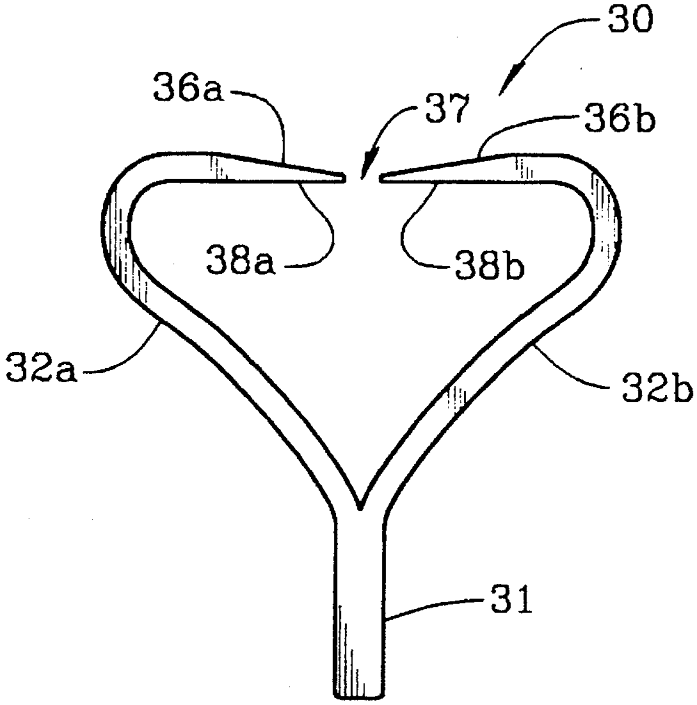
FIG. 10 is a side elevational view of the third embodiment of the electrical outlet cover remover shown in FIG. 9.

With reference to the drawings, FIGS. 1–10 illustrate several embodiments of the electrical outlet safety cover remover tool of the instant invention. The outlet cover removers disclosed herein comprise at least one substantially L-shaped member and are designed for prying conventional safety plugs from their outlet. The conventional plug 60, as seen in FIG. 8, has a flat cover with two extending non-conductive prongs 62 that are plugged into the outlet receptacles 52.

Figure 1:
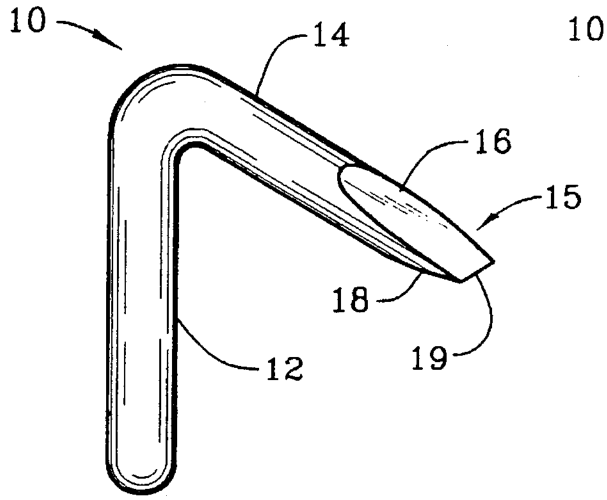
FIG. 1 is a perspective view of a first embodiment of the electrical outlet cover remover of the present invention.
Figure 2:
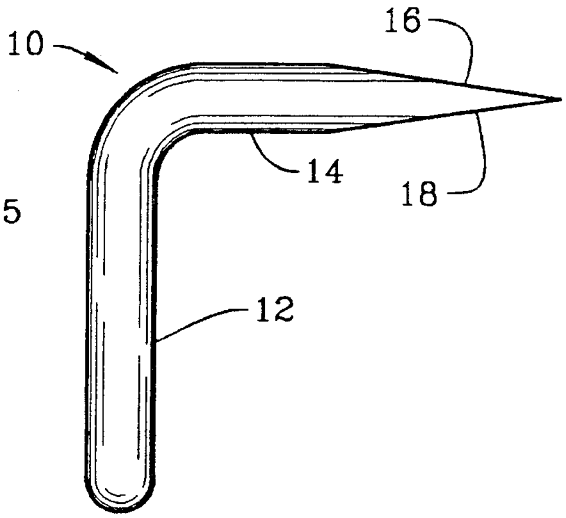
FIG. 2 is a side elevational view of the electrical outlet cover remover shown in FIG. 1.
Figure 3:
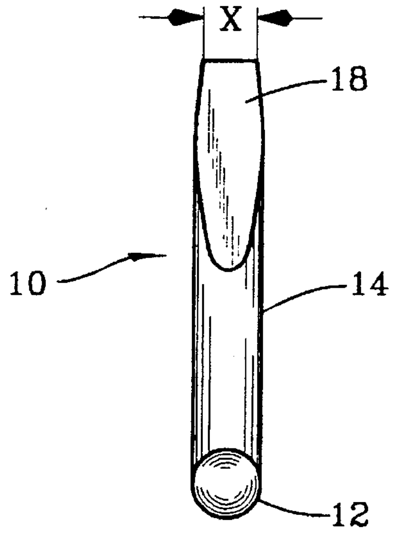
FIG. 3 is a bottom view of the electrical outlet cover remover shown in FIG. 1.

With reference to FIG. 1, a first embodiment of the outlet cover remover 10 comprises a non-conductive substantially L-shaped member having two legs 12, 14 of somewhat equal length. The length of each leg 12, 14 may be of any reasonable size, but it is generally believed that the preferred size is anywhere in the range of two to six inches. The first leg of the safety cover remover 10 forms a handle leg or section 12 having a free end 11 while the second leg forms a prying shank 14 defining a prying wedge 15 at its free end. The handle 12 is substantially cylindrical and is integrally joined at its upper end to the prying shank 14, as seen in FIGS. 1 and 2. The prying shank 14 extends from the handle 12 and eventually tapers toward a tip defining a generally straight edge 19. Edge 19 can also be curved or radiused. The prying wedge 15 is formed by an inclined top surface 16 and an inclined bottom surface 18 that converge or taper into the prying edge 19. Referring to FIGS. 1–3, the top and bottom tapered surfaces 16, 18 are shown terminating in a tip having a straight prying edge 19 that is perpendicular to the shank 14. This edge 19 is substantially thin so that it may wedge between the outlet plug 60 and the outlet 52 between prongs 62, as seen in FIG. 8. The width "x" of the straight edge 19 should be slightly less than the distance between the prongs 62 to effectuate penetration between the plug 60 and the socket 50. Thus, the width "x" of the tip 19 is typically ⅜ of an inch or less for all embodiments of the instant invention in order to accommodate the clearance between the prongs 52 found on conventional plugs. It should also be noted that both surfaces do not have to taper, that is, either the top surface 16 or the bottom surface 18 may taper individually and still collectively form prying wedge 15.

Alternatively, the outlet cover remover 20, as illustrated in

Figure 4:
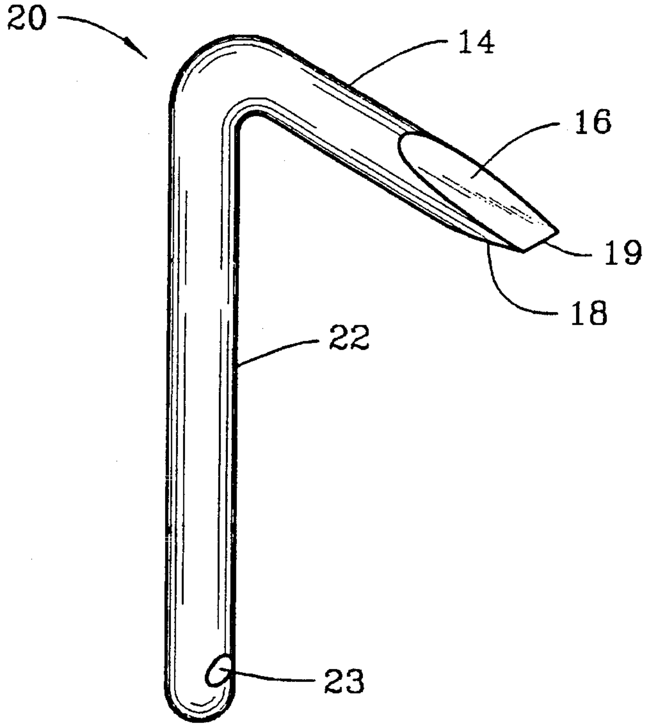
FIG. 4 is a perspective view of a modified form of the first embodiment of the electrical outlet cover remover illustrating a longer handle.
Figure 5:
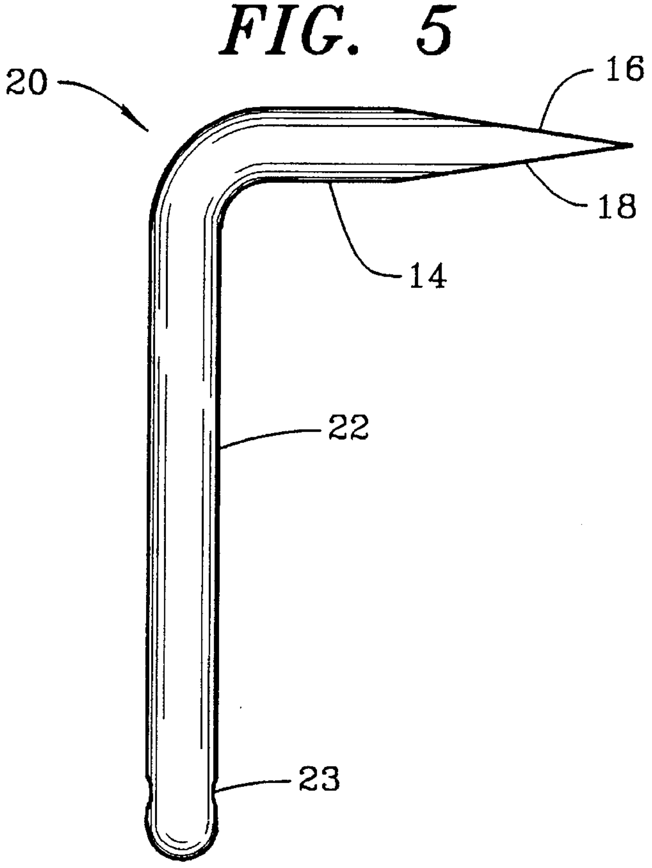
FIG. 5 is a side elevational view of the embodiment of the electrical outlet cover remover shown in FIG. 4.

FIGS. 4 and 5, may have a handle 22 that is longer in length relative to the prying shank 14 to provide a larger moment arm and hence an increase in mechanical leverage when prying the electrical outlet safety cover 60 from the outlet 50. In addition, a longer handle 22 is easier to use for the individual with larger hands. Meanwhile, the prying shank 14 retains its original length. So as not to detract from the advantage gained. The free end 21 of the handle 22 may also define an aperture 23 for receiving an accessory cord, a key ring or a tether for attachment to a cord to facilitate convenient storage of the tool. This not only makes the plug remover 20 more accessible for use but prevents the tool 20 from being lost. Aperture 23 is a feature that may be incorporated by any embodiment of the invention discussed herein.

A second embodiment, which I believe to be the best mode of the instant invention, is illustrated in FIGS. 6 and 7 by outlet cover remover 40. The outlet cover remover 40 is a non-conductive, substantially L-shaped tool comprised of a substantially square shaped handle 42 integrally joined to a prying shank 44 at an upper end of the handle. The prying shank 44 extends from the handle 42 in a manner that creates a smooth joint between the two legs. Handle 42 has a free end defining aperture 43 and side edges 41 that are integral with side edges 45 of shank 44. Prying shank 44 has a top surface 46 and a bottom surface 48. The bottom surface 48 is substantially flat and extends out to a generally straight edge or tip 49 without tapering. On the other hand, the top surface 46 begins to taper as it approaches the tip 49 and converges with the bottom surface 48 at the straight edge 49 to form a prying wedge. The edge or tip 49 is substantially thin for wedging between the outlet plug and the outlet and maintains a width that allows it to fit between the prongs on a conventional plug.

The outlet cover removers 10, 20 and 40 are all utilized in the manner illustrated by tool 20 in FIG. 8. The respective edges 19 of the individual tools are inserted between the plug 60 and outlet 52. The tapered ends of the prying shanks 14, 44 allow the tool to wedge the outlet plug legs 62 from the outlet 50 while the handle is pulled upward.

Consequently, the outlet cover remover comprises at least one L-shaped member with at least one prying edge as depicted in FIGS. 1–8. In a third embodiment, the electrical outlet cover remover may also resemble forceps whereby it utilizes two L-shaped members as depicted by, the tool 30 in FIGS. 9 and 10. In this embodiment, the electrical outlet cover remover 30 comprises two handles **32*a*, 32*b* which diverge from a central hub 31, as defined by the joining of free ends of the handles 32*a*, 32*b*, such that the two prying shanks 34*a*, 34*b* move toward each other to form forceps. Each handle 32*a*, 32*b* diverges outwardly and then bends inwardly perpendicularly to the central axis 31 to form prying shanks 34*a* and 34*b*. The handles should, be at least partially flexible to facilitate relative movement of the two prying shanks 34*a*, 34*b*. The prying shanks 34*a*, 34*b* terminate in opposing tapered ends having edges or tips 39*a* and 39*b* that define an outlet plug gap 37. The prying shanks 34*a*, 34*b* respectively define prying wedges having top surfaces 36*a* and 36*b* that taper into respective bottom surfaces 38*a*, 38*b*. The bottom surfaces 38*a*, 38*b* are generally flat in that they do not taper, however, the bottom surfaces 38*a*, 38*b* may taper like the top surfaces 36*a*, 36*b* without departing from the scope and spirit of the instant invention. To utilize the forcep styled tool 30, the outlet remover 30 is placed over the outlet plug such that it is positioned within gap 37. Each tip 39*a*, 39*b* is then inserted between the outlet plug and the outlet between outlet cover prongs 62 from opposite sides of the cover so that when the handles 32***a*, 32*b* are moved toward each other, the outlet cover is wedged and pried away from the outlet. Although not shown, hub 31 may also define an aperture for attaching the outlet cover remover to a cord, tether or key ring.

The outlet cover removers 10, 20, 30 and 40 discussed herein are at least partially flexible so that the tool may give without breaking when prying a cover from an outlet. Accordingly, the tools are typically fabricated from a non-conductive, semi-rigid plastic having some resiliency and preferably from a plastic which is reasonably heat and fire resistant.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A tool for removing an electrical outlet safety cover having prongs from an electrical outlet, said tool comprising:

at least one elongated handle for holding said tool when removing the cover, said at least one handle having a first free end and a second upper end;

at least one elongated prying shank connected to and extending from said upper end of said handle, ending in a tapered end distal from said handle; and an aperture formed in said free end of said handle for receiving a securing device.

2. A tool as recited in claim 1, wherein said handle and said shank are each substantially rectangular in cross section.

3. A tool as recited in claim 1, wherein said tapered end defines a substantially straight edge perpendicular to an elongate axis of said shank.

4. A tool as recited in claim 3, wherein said shank has a width dimension that allows said prying edge to fit between said prongs when removing the electrical outlet cover remover.

5. A tool as recited in claim 1 wherein said prying shank comprises:

a bottom surface extending from said handle to said tapered end; and a top surface extending from said handle to said tapered end, said top and bottom surfaces meeting in a substantially straight edge perpendicular to said shank.

6. A tool as recited in claim 1, wherein said tool is fabricated from a semi-rigid non-conductive material.

7. A tool as recited in claim 6, wherein said tool is fabricated of plastic.

8. A tool for removing outlet safety covers having prongs from electrical outlets, said tool comprising:

at least one substantially L-shaped member having a first leg extending from a second leg; said second leg having an upper end integrally joined with said first leg, said second leg having a free end;

said first leg having an end distal from said second leg; and a tapered prying edge generally perpendicular to said first leg defined by said distal end for wedging between the safety cover and the outlet.

9. A tool as recited in claim 8, further comprising an aperture defined by said free end for receiving a tethering means.

10. A tool as recited in claim 8, wherein said first leg is cylindrical in cross section between said prying edge and said second leg; and said second leg is cylindrical in cross section.

11. A tool as recited in claim 8, wherein said tool is fabricated from a semi-rigid plastic for removing outlet safety covers without breaking.

12. A tool as recited in claim 8, wherein said prying edge is smaller in width than the distance between the prongs on the outlet cover.

13. A tool as recited in claim 8, wherein said prying edge comprises an inclined top surface and a straight, flat bottom surface.

* * * * *